US011303047B2

(12) United States Patent
Hansen et al.

(10) Patent No.: US 11,303,047 B2
(45) Date of Patent: Apr. 12, 2022

(54) CONDUCTIVELY COATED FASTENING SYSTEMS FOR FULL SIZE DETERMINANT ASSEMBLY (FSDA)

(71) Applicant: The Boeing Company, Chicago, IL (US)

(72) Inventors: Darrin M. Hansen, Seattle, WA (US); Blake A. Simpson, Kent, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 16/736,638

(22) Filed: Jan. 7, 2020

(65) Prior Publication Data

US 2021/0210873 A1    Jul. 8, 2021

(51) Int. Cl.
*H01R 4/30* (2006.01)
*B64D 45/02* (2006.01)
*H01R 4/56* (2006.01)

(52) U.S. Cl.
CPC ............ *H01R 4/307* (2013.01); *B64D 45/02* (2013.01); *H01R 4/305* (2013.01); *H01R 4/56* (2013.01); *H01R 4/308* (2013.01)

(58) Field of Classification Search
CPC ........ B64D 45/02; H01R 4/305; H01R 4/307; H01R 4/308; H01R 4/56
See application file for complete search history.

(56) References Cited

U.S. PATENT DOCUMENTS

| 9,088,120 | B2* | 7/2015 | Lev | H01R 4/029 |
| 9,656,641 | B2 | 5/2017 | Griffith et al. | |
| 10,385,899 | B2* | 8/2019 | Germann | B21J 15/147 |
| 2019/0111632 | A1 | 4/2019 | Khosravani et al. | |
| 2019/0285109 | A1 | 9/2019 | Khosravani | |
| 2019/0285675 | A1 | 9/2019 | Khosravani | |

OTHER PUBLICATIONS

U.S. Appl. No. 16/242,115, filed Jan. 8, 2019, Hansen.
U.S. Appl. No. 16/693,613, filed Nov. 25, 2019, Reyes Brondo.

* cited by examiner

*Primary Examiner* — Carl J Arbes
(74) *Attorney, Agent, or Firm* — Dascenzo Gates Intellectual Property Law, P.C.

(57) ABSTRACT

Conductively coated fastening systems are disclosed herein. An apparatus includes a fastening system and a structural assembly. The structural assembly comprises a first structural element made of an electrically conductive fiber reinforced plastic and a second structural element. The first structural element comprises a first hole and the second structural element comprises a second hole. The first and second holes are separately pre-formed prior to assembly of the structural assembly. The structural assembly further comprises an electrically conductive gap filler applied to a first structural element sidewall of the first hole of the first structural element. The fastening system comprises a fastener comprising a head and a shank extending from the head. The shank is configured to be inserted into the first hole and the second hole.

20 Claims, 8 Drawing Sheets

CONDUCTIVELY COATED FASTENING SYSTEMS FOR FULL SIZE DETERMINANT ASSEMBLY (FSDA)

FIELD

The present disclosure relates to conductively coated fastening systems for full size determinant assembly (FSDA).

BACKGROUND

Many aircraft structures are constructed from lightweight composite materials, such as carbon fiber reinforced plastic (CFRP) because they are stronger and lighter than conventional metal alloys. The weight savings offered by these lightweight materials lowers fuel consumption and operating costs. Additionally, composites are more resistant to corrosion and fatigue over conventional metal alloys. CFRP comprises a matrix material, often a resin, and a fiber material such as carbon fiber. CFRP structural elements may be fastened to other CFRP, metal, or metal alloy structural elements. The structural elements are secured together with metallic fasteners inserted through holes formed through the structural elements. Fasteners generally include a bolt or a pin and a mating part such as a nut or a collar.

Conventional assembly and fastening approaches are expensive and time consuming. In particular, conventional structural assembly processes are time consuming because they require that components in an assembly be stacked and aligned twice—once to drill the holes, and then again to install the fasteners. This is because after match drilling the holes in the aligned stack of components, the components must be disassembled so that they can be cleaned and deburred prior to fay sealing. The components are then brought back together for a second time so that the fasteners can be inserted and secured with washers, nuts and/or collars. Further, these assembly approaches may require expensive and time-intensive tooling and alignment equipment that adds time and cost to the production process.

Thus, it may be desirable to utilize a more efficient assembly process like full size determinant assembly (FSDA) to reduce production time and expense. In FSDA, holes in each component are drilled separately, before the components are brought together in a stack. However, it may be difficult to utilize FSDA with composite components while still providing sufficient electromagnetic effects (EME) protection against lightning strikes. In particular, during a lightning strike, fasteners provide pathways for current mobility through structural joints. Because CFRP is substantially brittle, drilling holes through the CFRP causes the CFRP to locally fracture at the edges of the holes. These uneven hole sidewalls create gaps between some of the carbon fibers in the CFRP and the fastener, limiting the current pathways between the CFRP and the fastener. FSDA may further limit these current pathways because it may cause the holes in stacked components to not align. These misaligned holes may further limit contact between the CFRP and the fastener shank.

It is therefore desirable to provide a fastening system suitable for composite structures which overcomes EME issues and provides installation and production efficiencies.

SUMMARY

Apparatuses and methods for conductively coated fastening systems are disclosed. For example, an apparatus includes a fastening system and a structural assembly. The structural assembly comprises a first structural element made of an electrically conductive fiber reinforced plastic and a second structural element. The electrically conductive fiber in the electrically conductive fiber reinforced plastic comprises an electrically conductive material such as carbon, a metal, or a metal alloy. The first structural element comprises a first hole and the second structural element comprises a second hole. The first hole and second hole are separately pre-formed prior to assembly of the structural assembly and at least a portion of the first hole and second hole do not align. The structural assembly further comprises an electrically conductive gap filler applied to a first structural element sidewall of the first hole of the first structural element. The fastening system comprises a fastener comprising a head and a shank extending from the head. The shank is configured to be inserted into the first hole and the second hole. In some examples, the fastener comprises an electrically conductive coating.

As another example, a method for assembling and fastening a first structural element comprising an electrically conductive fiber reinforced plastic and a second structural element comprises: assembling the first structural element and second structural element using full size determinant assembly (FSDA); and fastening the first structural element and second structural element by inserting a fastener into overlapping holes of the first structural element and second structural element, wherein at least one of the overlapping holes is pre-formed and pre-coated with an electrically conductive gap filler prior to assembling the first structural element and second structural element. In some examples, the assembling further comprises pre-forming the overlapping holes and pre-coating first structural element holes of the overlapping holes of the first structural element. In some examples, the method additionally or alternatively comprises coating the fastener with an electrically conductive coating.

DESCRIPTION

Apparatuses and methods for conductively coated fastening systems for full size determinant assembly (FSDA) are disclosed. Generally, in the Figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
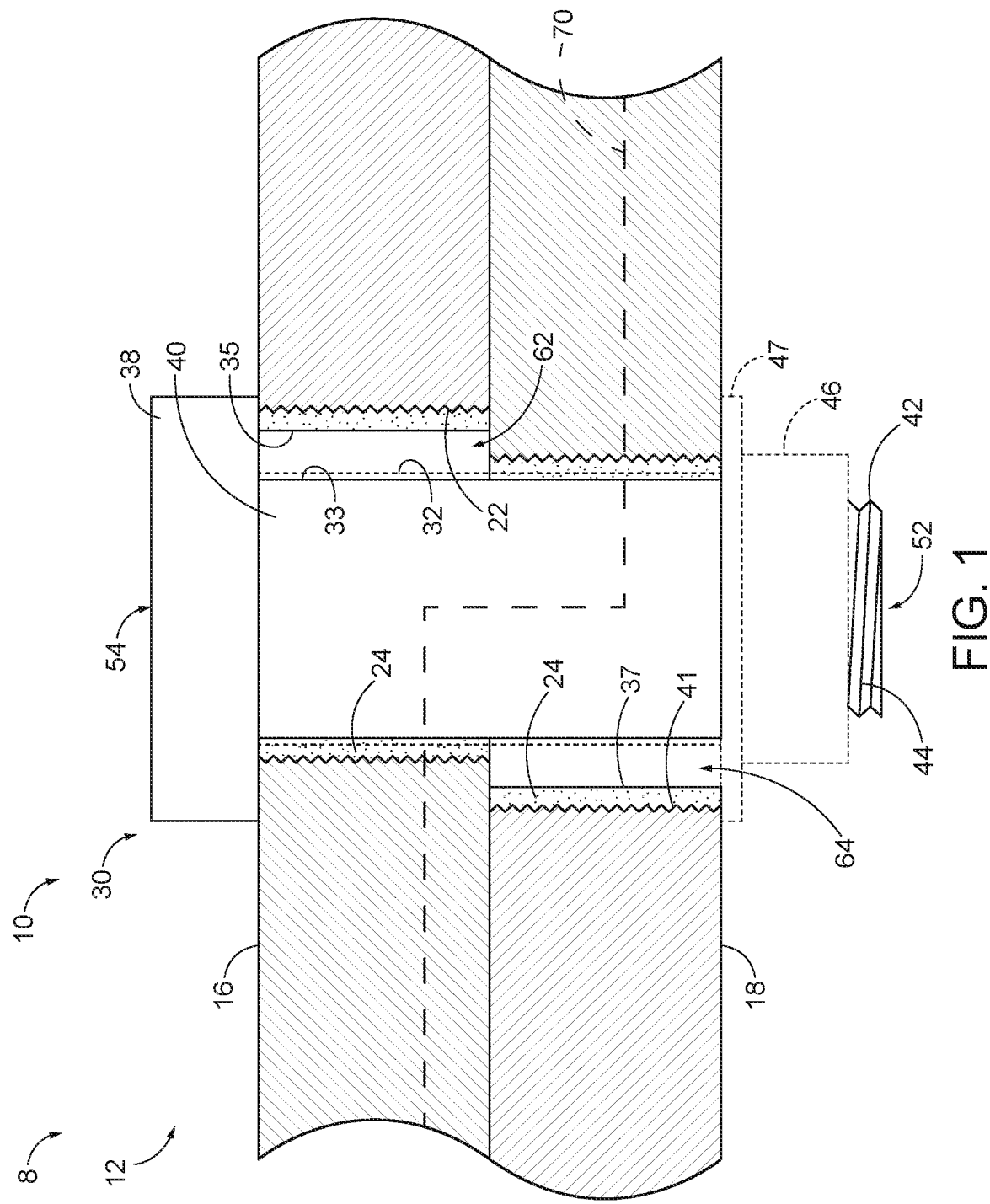
FIG. 1 is a cross-sectional schematic view of a conductive fastening system, fastening a structural assembly comprising two aircraft components assembled using full size determinant assembly (FSDA), in accordance with this disclosure.
Figure 2:
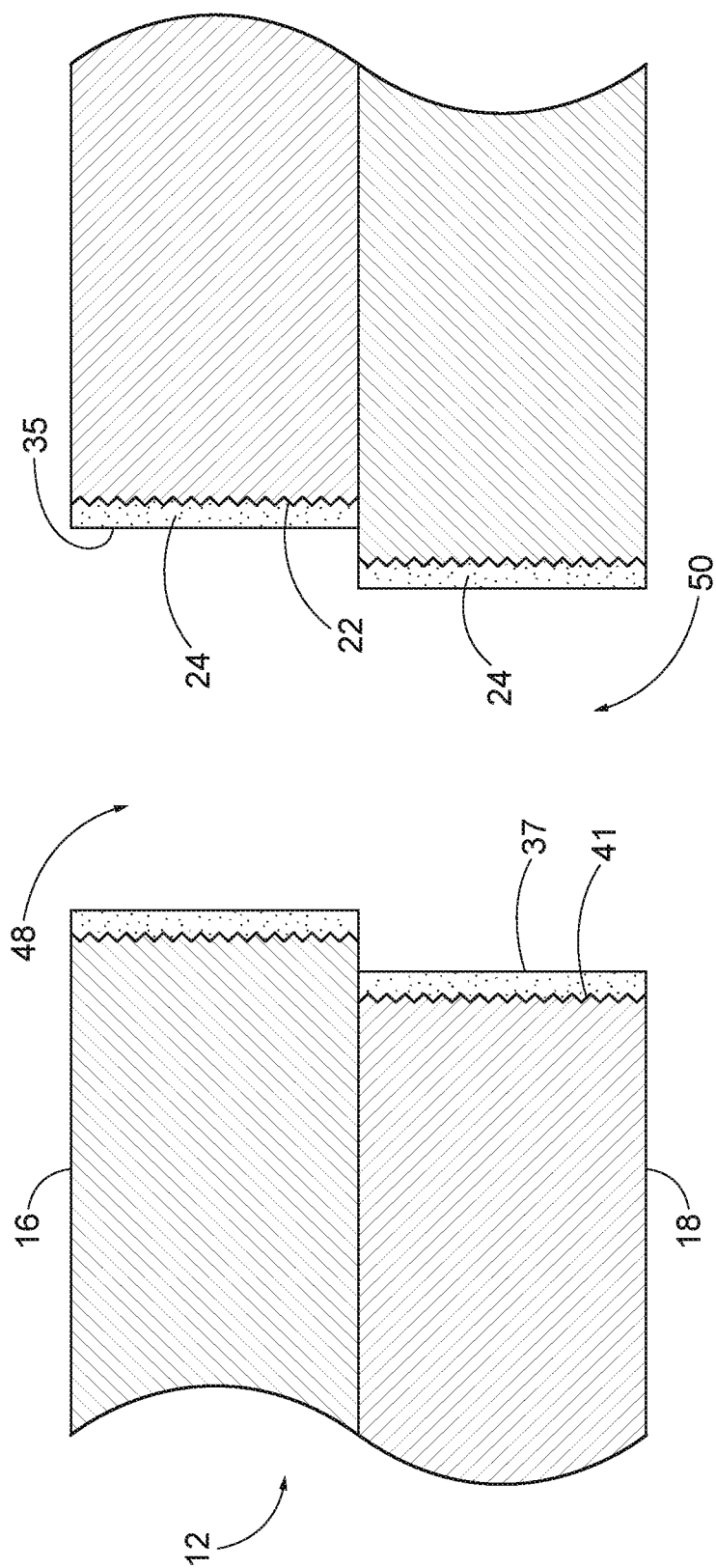
FIG. 2 is a cross-sectional schematic view of the structural assembly of FIG. 1 prior to fastening with the fastening system.

As schematically illustrated in FIG. 1, aircraft components (e.g., a first structural element 16 and a second structural element 18) may be assembled into a structural assembly 12 (e.g., fuel tank joints, side-of-body joints, wing joints, fuselage joints, major fittings etc.) using FSDA and then fastened to one another using a fastening system 10. As will be discussed in greater detail below, FSDA comprises pre-forming (e.g., pre-drilling) the holes of the different structural elements separately (e.g., at remote geographic locations, different times, different locations within the same geographic region, etc.), and then once the holes are formed, bringing the structural elements together and assembling (e.g., aligning stacking, and fastening) them to form a structural assembly. Because the holes of the at least two structural elements are drilled separately, the holes may not align perfectly when the structural elements are assembled, as shown in the example of FIG. 2. Further, drilling holes in an electrically conductive fiber reinforced plastic structural element leaves the edges of the structural element jagged and non-uniform. Thus, an electrically conductive gap filler (CGF) 24 is applied to the holes of electrically conductive fiber reinforced plastic structural elements and/or an electrically conductive coating 32 is applied to the fasteners. Coating the fasteners and/or holes with a conductive layer increases surface area contact between the fasteners and the sidewalls of the structural elements' holes, thereby providing a larger current pathway for electric charges to flow. Additionally, when a structural component is constructed of electrically conductive fiber reinforced plastic, as discussed herein, coating the holes with the CGF 24 fills in the rough surface of the hole and electrically connects the exposed ends of the electrically conductive fibers. Dispersing the electric current in this way minimizes component temperature spikes and thus reduces the likelihood that these components will act as ignition sources. By providing this ignition safeguard and electromagnetic effects (EME) protection, cost-saving FSDA can be used even for temperature-sensitive components like fuel tank components. FSDA in turn significantly reduces the time and expense of producing/manufacturing these structural assemblies. Thus, FSDA in combination with conductively coated holes cuts production costs and time without sacrificing safety.

As schematically illustrated in FIG. 1, an apparatus 8 comprises structural assembly 12 and fastening system 10. The structural assembly 12 comprises at least two structural elements (e.g., first structural element 16 and second structural element 18) and the at least two structural elements are fastened to one another via the fastening system 10. The structural assembly 12 may be a fitting and/or joint, such as one or more of: a fuel tank joint, wing joint, fuselage joint, side-of-body joint, and major fitting. In the example of FIG. 1, the at least two structural elements comprise two structural elements, the first structural element 16 and second structural element 18. However, in other examples, the structural assembly 12 comprises more than two structural elements, such as three, four, five, six, seven, or eight or more structural components that are fastened together by a fastening system 10. Thus, in some such examples, more than two components are pre-formed, stacked, and assembled using FSDA, and then fastened to one another using conductively coated fasteners and/or conductively filled holes.

The first structural element 16 comprises a component of an aircraft part (e.g., fuel tank, wing, fuselage, etc.), including one or more of: a fuel tank component, wing component (e.g., wing spar, exterior wing skin, wing panels, forward trunnion, drag brace, engine support fitting, underwing fittings, etc.), and fuselage components. At least one of the first structural element 16 and second structural element 18 is made of an electrically conductive fiber reinforced plastic. In one such example, the first structural element 16 is made of the electrically conductive fiber reinforced plastic. In another such example, the second structural element 18 is made of the electrically conductive fiber reinforced plastic. In yet another such example, both the first structural element 16 and second structural element 18 are made of the electrically conductive fiber reinforced plastic.

In some examples, the electrically conductive fiber reinforced plastic is constructed from only carbon fiber reinforced plastic (CFRP). In some such examples, the CFRP comprises layers of CFRP comprising a matrix material and a plurality of carbon fibers extending through the matrix material. In further such examples, the matrix material comprises one or more of a thermoplastic resin, such as polypropylene, polyethylene, and nylon, or a thermosetting resin such as an epoxy. In other examples, the electrically conductive fiber reinforced plastic comprises a different type of electrically conductive fiber other than carbon fiber, such as one or more metallic fibers. In yet further examples, the structural element comprising the electrically conductive fiber reinforced plastic is constructed from both CFRP and one or more additional metallic materials, including one or more of aluminum and titanium.

At least a portion of the second structural element 18 is positioned adjacent to the first structural element 16 such that at least portions of the first structural element 16 and the second structural element 18 directly physically touch/contact one another. Due to their proximity, the first structural element 16 and second structural element 18, in some examples, comprise components of the same aircraft part (e.g., both of the structural elements may be components of a fuel tank). However, in other examples, the first structural element 16 and second structural element 18 comprise components of different but adjacent aircraft parts (e.g., wing and fuel tank, wing and engine, wing and fuselage, etc.), and in some such examples, the first structural element 16 and second structural element 18 are fastened to one another to couple the different aircraft parts. Together, the first structural element 16 and second structural element 18 form the structural assembly 12.

In some examples, the second structural element 18 is constructed from the same materials as the first structural element 16. As one such example, the first structural element 16 and second structural element 18 are both constructed from CFRP. In other examples, the second structural element 18 is constructed from different materials than the first structural element 16. As one such example, one of the structural elements (either first structural element 16 or second structural element 18) is constructed from an electrically conductive fiber reinforced plastic and the other is constructed from a metal alloy. As another example, the structural elements are both constructed from electrically conductive fiber reinforced plastics, but comprise different types of electrically conductive fiber reinforced plastics. As yet another example, both of the structural elements are constructed from the same and/or different electrically conductive fiber reinforced plastics, but one of the structural elements additionally includes other electrically conductive fibers.

In accordance with FSDA, holes are pre-formed (e.g., pre-drilled, pre-molded, pre-reamed, or otherwise pre-formed) in the first structural element 16 and second structural element 18 prior to assembling the structural elements into the structural assembly 12. In particular, a first structural element hole 48 is drilled, molded, reamed, or otherwise formed into the first structural element 16 and a second structural element hole 50 is drilled, molded, reamed, or otherwise formed into the second structural element 18. Although only one of each of the first structural element hole 48 and second structural element hole 50 are shown in FIGS. 1-3, in other examples, the first structural element 16 and second structural element 18 include a plurality of the first structural element hole 48 and second structural element hole 50. In some such examples, the number of first structural element holes 48 and second structural element holes 50 included in the first structural element 16 and second structural element 18 depend on the size and shape of the structural assembly 12 and the desired level of fastening for a particular application.

Drilling and/or forming the first structural element hole 48 and second structural element hole 50 may leave the edges of the structural elements where the holes are located (i.e. the sidewalls of the holes) uneven, bumpy, rough, irregular, jagged, etc., especially when the first structural element 16 and second structural element 18 comprise an electrically conductive fiber reinforced plastic. In the examples of FIGS. 1-2, the first structural element 16 comprises a first structural element sidewall 22 that is irregular and/or not smooth (e.g., jagged, bumpy, rough, etc.) and contains a plurality of crevices on its uneven surface. The second structural element 18 also comprises a second structural element sidewall 41 that is similarly irregular and/or not smooth in examples where the second structural element 18 comprises an electrically conductive fiber reinforced plastic. However, it should be appreciated that in other examples, such as where one of the first structural element 16 or second structural element 18 comprises a metal alloy and not a fiber reinforced plastic, the sidewalls of the non-plastic structural element are less irregular, and instead are more substantially smooth than depicted in FIG. 1.

To fill in the crevices created on the hole sidewalls of the structural elements comprising electrically conductive fiber reinforced plastic by these bumpy surfaces and form a smoother surface that is more electrically conductive, a CGF 24 is applied to the structural element sidewalls of the first structural element 16 and second structural element 18 that comprise electrically conductive fiber reinforced plastic. At least one of the first structural element 16 and second structural element 18 comprises an electrically conductive fiber reinforced plastic. In some examples, only one of the first structural element 16 or second structural element 18 comprises electrically conductive fiber reinforced plastic. In such examples, where one of the first structural element 16 or second structural element 18 comprises only a metal or metal alloy, CGF 24 is not applied to structural element sidewall of the non-plastic structural element. In such examples, CGF 24 is only applied to the structural element that comprises the electrically conductive fiber reinforced plastic. However, in other examples, both of the first structural element 16 and second structural element 18 comprise electrically conductive fiber reinforced plastic, and the hole sidewalls of both first structural element 16 and second structural element 18 are coated with the CGF 24. The CGF 24 is applied by one or more of abrading, injecting, and spraying the CGF 24 onto one or more of the first structural element sidewall 22 and second structural element sidewall 41.

In one example, the CGF 24 is rubbed or mechanically abraded at room temperature against one or more of the first structural element sidewall 22 and second structural element sidewall 41. In one such abrading approach, an apparatus is used to accomplish the abrading, the apparatus comprising: a support structure; bearings supported by the support structure; a spindle rotatably supported by the bearings; a motor mechanically coupled to the spindle for driving rotation of the spindle; a chuck coupled to the spindle; and a hole coating applicator comprising a shaft made of a material that is not a low melting alloy (LMA) and clamped by the chuck, and an LMA pad that is supported by the shaft and radially movable relative to the shaft. In some such coating apparatuses, the hole coating applicator further comprises a flexural element that is configured to bend relative to the shaft due to flexure of a flexural hinge, and the LMA pad is attached to the flexural element. In other such abrading apparatuses, the hole coating applicator further comprises: a camming surface; a camming block that carries the LMA pad and has an inclined surface in contact with the camming surface; and a spring that exerts an axial spring force on the camming block, wherein the camming surface deflects the camming block to move radially outward when the axial spring force is exerted on the camming block. Other methods and apparatus for abrading CGF 24 to one or more of the first structural element sidewall 22 and second structural element sidewall 41 are described in commonly-owned U.S. patent application Ser. No. 15/923,630 entitled "METHOD, APPARATUS AND APPLICATOR FOR APPLYING A COATING ON A SURFACE OF A LAMINATION," the disclosure of which is incorporated by reference herein in its entirety.

In another example, the CGF 24 is alternatively applied to one or more of the first structural element sidewall 22 and second structural element sidewall 41 by heating the CGF 24 to a molten state and applying the molten CGF 24 to one or more of the first structural element sidewall 22 and the second structural element sidewall 41. In some such examples, the molten CGF 24 is injected into one or more of the first structural element sidewall 22 and second structural element sidewall 41 using any suitable method that is known in the art. As one such example, the CGF 24 is heated to a temperature corresponding to the lowest melting point of the CGF 24 (i.e. "eutectic melt temperature") to render the CGF 24 to a molten state. A nozzle having an internal channel system is then inserted into the first structural element hole 48 and/or second structural element hole 50. A narrow gap separates the first structural element sidewall 22 and second structural element sidewall 41 from the nozzle. The nozzle is then withdrawn from the first structural element hole 48 and/or second structural element hole 50. As the nozzle is being withdrawn, molten CGF 24 is forced into and through the internal channel system and out of a circular circumferential orifice of the nozzle and injected into the gap separating nozzle to coat the first structural element sidewall 22 and second structural element sidewall 41 with molten CGF 24. When the molten CGF 24 solidifies, the resulting CGF coated hole will have a diameter defined by the external diameter of the nozzle. However, the thickness of the LMA applied to sidewall of the hole will decrease the diameter of hole, preferably by not more than about 0.0005 of an inch. Other methods and apparatus for injecting molten LMA onto the first structural element sidewall 22 and second structural element sidewall 41 are described in commonly-owned U.S. patent application Ser. No. 15/786, 665 entitled "APPARATUS AND METHODS FOR INJECTING FILLER MATERIAL INTO A HOLE IN A COMPOSITE LAYER", the disclosure of which is incorporated by reference herein in its entirety.

In yet a further example, the CGF 24 is applied to one or more of the first structural element sidewall 22 and second structural element sidewall 41 by spraying the CGF 24 onto one or more of the first structural element sidewall 22 and second structural element sidewall 41. In some such examples, the CGF 24 is a pure metal, preferably nickel or zinc. Suitable spraying methods include, but are not limited to, cold spray (also referred to as supersonic particle deposition or gas dynamic cold spray) and thermal spraying (e.g. plasma spraying). In an implementation using cold spray, nickel in the form of a fine powder is accelerated to a very high speed by a carrier gas and forced through a nozzle onto the first structural element sidewall 22 and second structural element sidewall 41. Upon impact, the nickel particles deform plastically and bond mechanically to the first structural element sidewall 22 and second structural element sidewall 41 to form a coating. The thickness of the CGF 24 depends on various factors such as the type of metal and method of spraying used. Generally, however, the thickness of the CGF 24 applied to sidewall of the hole will decrease the diameter of hole by not more than about 0.0005 of an inch.

To ensure that a sufficient amount of CGF 24 is applied to one or more of the first structural element sidewall 22 and second structural element sidewall 41, a real-time monitoring system is employed in some examples to verify that the contact resistance is within an acceptable range. As one such example, the monitoring system utilizes a capacitive coupling to measure the effective resistance of the CGF 24 and the random parallel resistance of the carbon fibers in the CFRP layers in the structural assembly 12 in series. A feedback loop is used to control the CGF application process and confirm its completion to a satisfactory resistance level based on the response by the monitoring system. By applying CGF 24 to form a coating in the hole, concurrently measuring the effective resistance of the CGF 24 and carbon fibers in series, and then ceasing application of CGF 24 when a specified effective resistance is achieved, at least a minimum acceptable electrical conductivity at the interface of the first structural element hole 48 and second structural element hole 50 and an inserted fastener can be achieved in the final structural assembly 12. In some such examples, the resistance level of the CGF 24 is within a threshold resistance level that depends on factors such as the thickness of the structural assembly 12 and the size and geometry of an inserted fastener. Other methods and apparatus for verifying that the contact resistance is within an acceptable range are described in commonly-owned U.S. patent application Ser. No. 15/923,630, supra, and commonly-owned U.S. patent application Ser. No. 15/923,436 entitled "SYSTEMS AND METHODS FOR MEASURING THE ELECTRICAL CONTACT RESISTANCE AT AN INTERFACE," the disclosures of which are incorporated by reference herein in their entireties.

In the example of FIG. 1, both of the first structural element 16 and second structural element 18 comprise electrically conductive fiber reinforced plastic, and thus are both coated with CGF 24. However, as explained above, in other examples, only one of the first structural element 16 or second structural element 18 comprises electrically conductive fiber reinforced plastic and is coated with the CGF 24. The CGF 24 substantially fills the crevices formed by the jagged edges of one or more of the first structural element sidewall 22 and second structural element sidewall 41 (thereby covering the first structural element sidewall 22 and second structural element sidewall 41), and forms a first structural element hole sidewall 35 on the first structural element hole 48 of the first structural element 16 and a second structural element hole sidewall 37 on the second structural element hole 50 of the second structural element 18, thereby providing smoother, flatter, and more conductive surfaces on the first structural element sidewall 22 and second structural element sidewall 41 of the first structural element hole 48 and second structural element hole 50 of the first structural element 16 and second structural element 18, respectively. Therefore, with the CGF 24, the first structural element hole 48 and second structural element hole 50 are defined by the CGF 24, which forms substantially planar, smooth surfaces. Thus, after coating with the CGF 24, the first structural element 16 comprises the first structural element hole sidewall 35 (which covers the first structural element sidewall 22 and defines the first structural element hole 48), and the second structural element 18 comprises the second structural element hole sidewall 37 (which covers the second structural element sidewall 41 and defines the second structural hole 50). As such, the CGF 24 forms the first structural element hole sidewall 35 and second structural element hole sidewall 37, and the first structural element hole sidewall 35 and second structural element hole sidewall 37 in turn define the first structural element hole 48 and second structural element hole 50 of the first structural element 16 and second structural element 18, respectively. That is, within the first structural element hole 48 and second structural element hole 50, the first structural element hole sidewall 35 and second structural element hole sidewall 37, respectively, are the exterior surfaces of the CGF-coated first structural element 16 and second structural element 18, respectively. With the CGF 24, the first structural element hole sidewall 35 and second structural element hole sidewall 37 are flat and smooth.

The CGF 24 is constructed from an LMA, comprised of elements that are compatible with all cross-functional requirements of the desired application, for example an aircraft fuel tank environment. As used herein, the term "LMA" is defined as alloys having a melting temperature in a range greater than about 140 degrees Fahrenheit (° F.) (60 degrees Celsius (° C.)) and less than about 400° F. (204° C.). In some such examples, the LMA has a melting temperature in a range between about 140° F. (77° C.) and about 400° F. (204° C.). The LMA is constructed from a conductive material with electrical conductivity equal to or greater than the electrical conductivity of carbon fiber when carbon fibers are the electrically conductive fibers of a corresponding first structural element 16 or second structural element 18. In one such example, the LMA is constructed from two or more elements of the following: bismuth, indium, tin, nickel and zinc (e.g. INDALOY®). In another such example, the LMA is a ternary alloy consisting of a mixture of bismuth (preferably more than 50%), indium and tin. Due to its softness, the LMA performs like a solid lubricant making insertion of a fastener 30 easier with lower insertion force. In other examples, instead of LMA, the CGF 24 alternatively comprises a pure metal such as tin.

Figure 3A:
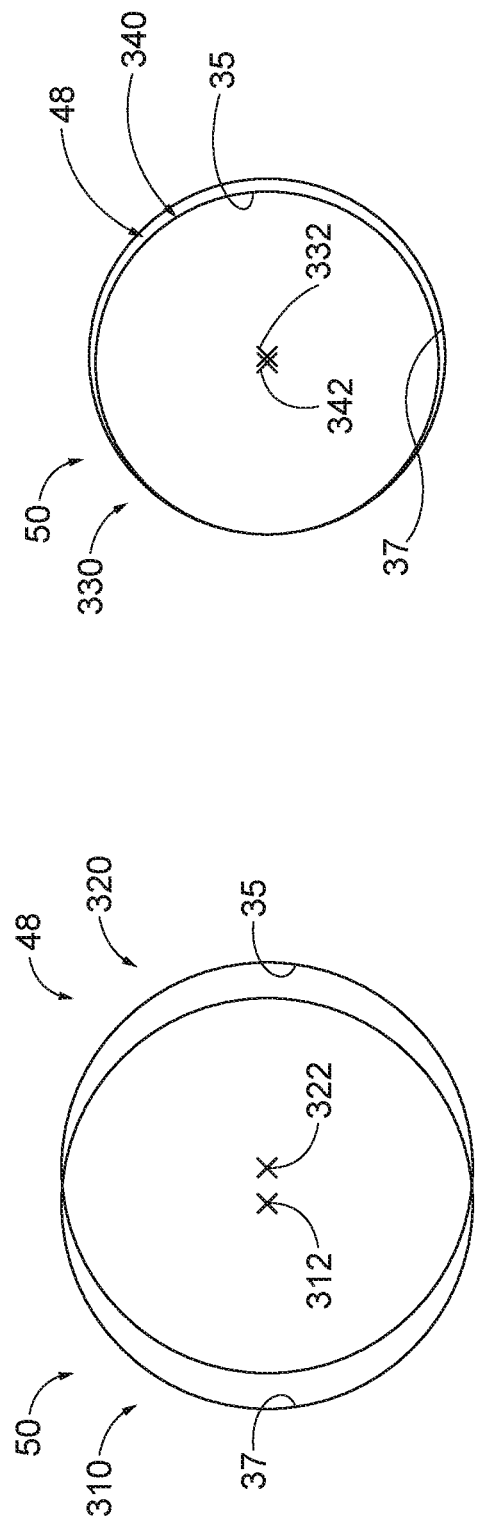
FIG. 3A is a top schematic view of overlapping holes of the structural assembly of FIG. 1 in a first condition.
Figure 3B:
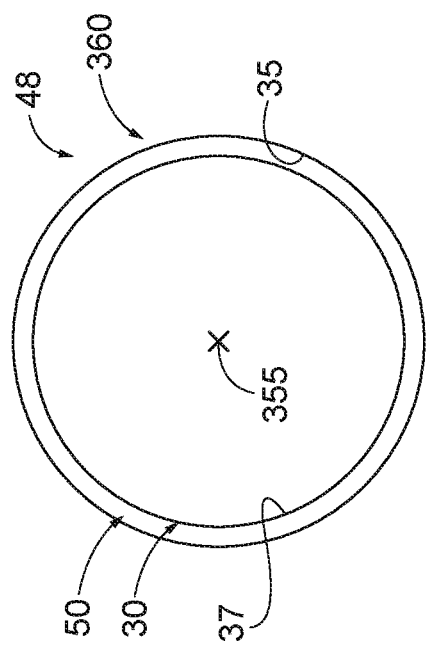
FIG. 3B is a top schematic view of overlapping holes of the structural assembly of FIG. 1 in a second condition.
Figure 3C:
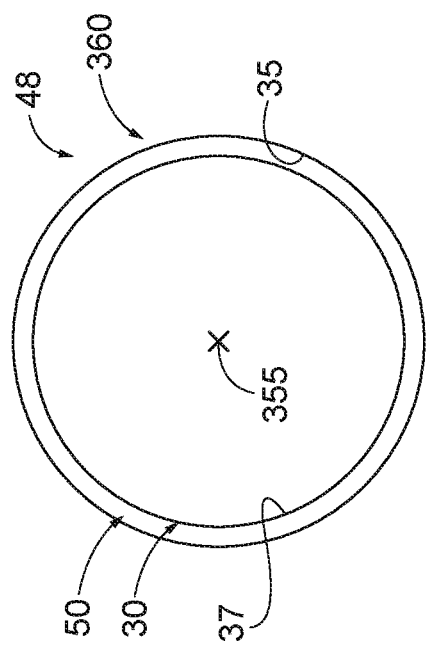
FIG. 3C is a top schematic view of overlapping holes of the structural assembly of FIG. 1 in a third condition.

After the first structural element hole 48 and second structural element hole 50 have been formed (e.g., drilled), and the first structural element sidewall 22 and second structural element sidewall 41 have been coated with the CGF 24, the first structural element 16 and second structural element 18 are aligned and assembled in accordance with FSDA procedure (explained in greater detail below with reference to FIG. 7). FIG. 2 illustrates a schematic representation of the first structural element hole 48 and second structural element hole 50 after the first structural element 16 and second structural element 18 are aligned and assembled, but before they have been fastened with the fastening system 10. As discussed above, and as shown in the example of FIGS. 1 and 2, because the first structural element hole 48 and second structural element hole 50 are drilled separately in FSDA, they do not always align with one another when the first structural element 16 and second structural element 18 are assembled to form the structural assembly 12. Thus, as shown in the example misalignment condition of FIGS. 1 and 2, the first structural element hole 48 and second structural element hole 50 are misaligned. In particular, the first structural element hole sidewall 35 of the first structural element hole 48 and the second structural element hole sidewall 37 of the second structural element hole 50 do not align with one another. Instead, the first structural element hole sidewall 35 and second structural element hole sidewall 37 are misaligned, and thus as shown in the cross-sectional view of FIGS. 1 and 2, the first structural element hole sidewall 35 and second structural element hole sidewall 37 are offset from one another. FIGS. 3A-3C show additional conditions where at least a portion of the first structural element hole sidewall 35 and second structural element hole sidewall 37 do not align. However, in still further examples, the holes do align. For example, when the first structural element 16 and second structural element 18 comprise a plurality of holes, some of the holes align and others do not.

In some examples, such as the examples shown in FIGS. 1 and 2, the first structural element hole 48 and second structural element hole 50 are circular or generally circular and comprise substantially the same dimensions (i.e. same diameter and depth). However, in other examples, the first structural element hole 48 and second structural element hole 50 comprise different dimensions and/or sizes. As one such example, the first structural element hole 48 and second structural element hole 50 comprise different diameters. As another such example, the first structural element hole 48 and second structural element hole 50 comprise different depths. As yet another such example, the first structural element hole 48 and second structural element hole 50 comprise different diameters and different depths. In yet further examples, the first structural element hole 48 and second structural element hole 50 additionally or alternatively comprise different shapes (e.g., elliptical vs. circular, rectangular vs. circular, triangular, circular, etc.), profiles (e.g., tapered vs. straight), cross-sections, etc.

As shown in the examples of FIGS. 1 and 2, the first structural element hole sidewall 35 and second structural element hole sidewall 37 are substantially straight and have no taper. However, in other examples, the first structural element hole sidewall 35 and second structural element hole sidewall 37 comprise a different shape, such as tapered. In one such example, the first structural element hole sidewall 35 of the first structural element hole 48 (particularly the top of the first structural element hole 48) is tapered in an outward direction to allow the fastener 30 to be countersunk into a top the first structural element 16.

Returning to FIG. 1, it shows a schematic representation of the fastening system 10 and how it fastens the structural assembly 12 to secure the first structural element 16 and second structural element 18 together, once the first structural element 16 and second structural element 18 have been assembled in accordance with FSDA. The fastening system 10 comprises the fastener 30, which in some examples includes the electrically conductive coating 32, and the fastener 30 comprises a fastener head 38 and a shank 40.

The fastener 30 is constructed from metallic materials including, but not limited to, one or more of titanium, stainless steel, aluminum, and combinations of alloys thereof. The dimensions of the fastener 30 depend on the number of structural elements stacked in the structural assembly 12, the thicknesses of the structural elements, the type of fastener, and the diameter of the first structural element hole 48 and second structural element hole 50 of the structural elements. In some examples (e.g., the example shown in FIG. 4) the fastener comprises a sleeveless fastener (i.e. a solid shank fastener). In other examples, (e.g., the examples shown in FIGS. 5 and 6) the fastener 30 comprises a sleeved fastener comprising a solid shank and a sleeve.

In some examples, the electrically conductive coating 32 is applied to an exterior surface 33 of the fastener 30 and comprises an electrically conductive material. In particular, the electrically conductive coating 32 is applied to the fastener when the fastener 30 comprises a sleeveless (i.e. solid shank) fastener. In such examples, the electrically conductive coating 32 is applied to ensure adequate current flow between the fastener 30 and the first structural element 16 and second structural element 18 when the fastener 30 is in a clearance fit with one or more of the first structural element hole 48 and second structural element hole 50. In some examples, the electrically conductive coating 32 is also applied when the fastener is a one-sided fastener. However, in other examples, the electrically conductive coating 32 is not applied to the fastener 30, such as when the fastener is a sleeved fastener.

Methods and apparatus for coating the fastener 30 with a conducting coating are described in commonly-owned U.S. patent application Ser. No. 16/693,613, entitled "METHOD FOR PLATING A METALLIC MATERIAL ONTO A TITANIUM SUBSTRATE," and U.S. patent application Ser. No. 16/242,115, entitled "CONDUCTIVE FASTENING SYSTEM AND METHOD FOR IMPROVED EME PERFORMANCE," the disclosures of which are incorporated by reference herein in their entireties.

In some examples, the electrically conductive coating 32 is applied to the entire exterior surface 33 of the fastener 30 such that the entire fastener 30 is covered in the electrically conductive coating 32 (i.e., the fastener 30 is encapsulated by the electrically conductive coating 32). However in other examples, the electrically conductive coating 32 is only applied to a portion of the exterior surface 33. As one such example, the electrically conductive coating 32 is only applied to the shank 40, as shown in FIG. 1. In further such examples, the electrically conductive coating 32 is only applied to a portion of the shank 40.

The electrically conductive coating 32 is applied in a uniform thickness in some examples. The thickness of the electrically conductive coating 32 is in the range of 0.0001 of an inch (0.003 mm) to 0.0006 of an inch (0.02 mm) and is determined based on numerous factors such as the coating composition, and the size and geometry of the structural assembly 12, and the desired application for the structural assembly 12. The electrically conductive coating 32 enhances electrical conductivity, provides lubricity, and helps to mitigate corrosion by providing a sacrificial layer in a manner analogous to cadmium plating.

The electrically conductive coating 32 has a melting temperature that is greater than a maximum temperature expected to be experienced by the CFRP in the structural assembly 12 during use, e.g., operation of an aircraft, and during a finish curing process. Thus, the electrically conductive coating 32 will not melt or soften during use or during a final curing process of the CFRP. The electrically conductive coating 32 is made from one or more of tin, zinc, indium, bismuth, or combinations and alloys thereof. One example is an electrically conductive coating 32 composed of 100% indium or substantially composed of indium. Another example is a tin-zinc-bismuth alloy made up of approximately 65% tin and approximately 32-33% zinc, with the remainder comprising bismuth. Bismuth is non-reactive with both titanium and CFRP, which facilitates extending the service lifetime of the fastener 30. Additionally, bismuth has a melting temperature greater than 180° F. and will not melt or soften during typical uses of the structural assembly 12 during use, e.g., operation of an aircraft, or during a final curing process of the CFRP. In tin-based coatings, bismuth also helps with the prevention or retardation of tin pest, a low temperature transformation of tin into a brittle phase. In some examples, solid additives are added to the electrically conductive coating 32 such as PTFE or boron nitride that aid in lubricity in structural assemblies 12 that contain CFRP. The tin-zinc-bismuth alloy is soft, providing low shear resistance to facilitate insertion of the shank 40 of the fastener 30 into the first structural element hole 48 and second structural element hole 50. The tin-zinc-bismuth alloy is also highly conductive and provides intimate electrical contact between the fastener 30 and the first structural element hole sidewall 35 and second structural element hole sidewall 37 of the first structural element hole 48 and second structural element hole 50, respectively. In other examples, the electrically conductive coating 32 is alternatively composed of a tin-bismuth alloy (without any zinc), or alloys based on indium such as tin-indium or zinc-indium, which are soft and galvanically compatible with aluminum.

The electrically conductive coating 32 is applied to the fastener 30 using one or more of vacuum deposition, electroplating, and thermal spray processing. In one implementation, the electrically conductive coating 32 is applied as a liquid sprayed onto the fastener 30. In another example, the electrically conductive coating 32 is applied by dipping the fastener 30 into a liquid volume of electrically conductive coating 32. In some such examples, multiple applications of electrically conductive coating 32 are applied to the fastener 30 in order for the electrically conductive coating 32 to reach a desired thickness. For example, the fastener 30 is repeatedly dipped into the liquid volume of electrically conductive coating 32 in order to build up a coating that has a desired thickness that is substantially uniform along the length of the shank 40. Although alternative methods for applying the electrically conductive coating 32 are described herein as applying to a single fastener 30, the electrically conductive coating 32 is applied to tens or hundreds of fasteners 30 in other examples.

In some examples, the electrically conductive coating 32 also receives a conversion treatment (e.g. phosphate conversion or chromate conversion) on all or only a part of the fastener 30 (for example applied only to the fastener head 38 of the fastener 30) to facilitate adhesion of paint. Alternatively, instead of a conversion treatment, a sol-gel treatment is applied on all or only a part of the fastener 30 prior to the painting. The term "sol-gel", a contraction of solution-gelation, refers to a series of reactions where a soluble metal species (typically a metal alkoxide or metal salt) hydrolyzes to form a metal hydroxide. In addition, a lubricating coating consisting of a lubricant such as cetyl alcohol may also be applied over the conductive coating to a thickness of less than about 0.0002 of an inch, and preferably less than about 0.0001 of an inch.

In examples where the fastener 30 comprises a one-sided fastener, the electrically conductive coating 32 is applied to either the core bolt, the sleeve, or to both in the same manner as described above with respect to sleeveless fasteners, in some examples. In some such examples, the electrically conductive coating 32 is applied to the interior and/or exterior surface of the sleeve and covers either the entire sleeve or only a portion of the sleeve.

Before applying the electrically conductive coating 32 on the fastener 30, an adhesion layer (not shown) is deposited on the fastener 30 in some examples to increase the adhesion of the electrically conductive coating 32 to the fastener 30. As one such example, a nickel strike is employed as the adhesion layer. In other such examples, a copper or an iron strike is used. The adhesion layer is applied by one or more of a vacuum deposition process, electrodeposition, or by any other process known in the art that is suitable for applying an adhesion layer.

Because the electrically conductive coating 32 is applied on the exterior surface 33 of the fastener 30, it covers the portion of the fastener 30 on which it is applied.

The fastener 30 is inserted into the first structural element hole 48 and second structural element hole 50 to secure the first structural element 16 and second structural element 18. In particular, the shank 40 extends into, and in some examples all of the way through, the first structural element hole 48 and second structural element hole 50. As shown in FIG. 1, the shank 40 is initially inserted through the first structural element hole 48 of the first structural element 16 such that the fastener head 38 of the fastener 30 protrudes from the first structural element 16. In particular, in the example of FIG. 1, the shank 40 comprises a straight, cylindrical shape, and the fastener head 38 comprises a cylindrical shape with a larger diameter than the shank 40 and first structural element hole 48, such that the fastener head 38 remains outside the first structural element hole 48 and second structural element hole 50 on an exterior surface of the first structural element 16. However, in other examples, the shank 40 and/or the fastener head 38 comprise other shapes and/or sizes.

As just one alternative example, a portion of the shank 40 immediately adjacent to a mating portion 42 forms a tapered lead-in section that tapers gradually in a linear taper toward the mating portion 42 with a taper angle equal to or less than 20 degrees. In another example, the fastener head 38 of the fastener 30 is tapered and also extends into the first structural element hole 48 (i.e. the fastener head 38 is countersunk into the first structural element 16). In some such examples where the fastener head 38 is countersunk, the fastener head 38 extends all the way into the first structural element hole 48 such that it does not protrude from the surface of the first structural element 16. Countersunk heads may be used on the aircraft skin, so that the fasteners do not protrude from the exterior surface of the aircraft.

As another example, the shank 40 is not straight and is instead one or more of curved, angled, bent, spiral, etc.

In some examples, where the first structural element hole sidewall 35 and second structural element hole sidewall 37 of the first structural element hole 48 and second structural element hole 50 do not align, the fastener 30 forms a clearance fit with one or more of the first structural element hole 48 and second structural element hole 50. That is, although the fastener 30 does make physical contact with at least a portion of the first structural element 16 and second structural element 18, the fastener 30 in some examples, does not make contact with all surfaces of the first structural element hole sidewall 35 and second structural element hole sidewall 37, and thus, one or more clearances or gaps are formed between the fastener 30 and the first structural element hole sidewall 35 and second structural element hole sidewall 37 of the first structural element hole 48 and second structural element hole 50. In some such examples, such as the example shown in FIG. 1, a first gap 62 is formed between the fastener exterior surface 33 and the first structural element hole sidewall 35 of the first structural element hole 48. Additionally or alternatively, a second gap 64 is formed between the fastener exterior surface 33 and the second structural element hole sidewall 37 of the second structural element hole 50. It should be appreciated that the first gap 62 and the second gap 64 are exaggerated for illustrative purposes in FIG. 1 so that they can be seen more easily. However, the first gap 62 and the second gap 64 may be significantly smaller, in other examples.

In the first gap 62 and the second gap 64, the fastener 30 (and in particular the exterior surface 33 of the fastener 30) does not directly touch or physically contact the first structural element hole sidewall 35 and second structural element hole sidewall 37 respectively, of the first structural element hole 48 and second structural element hole 50 of the first structural element 16 and second structural element 18, respectively. Thus, in some such examples, only air exists in the first gap 62 and second gap 64. FIGS. 3A-3C show other example clearance fit conditions.

However, in the example of FIG. 1, portions of the fastener 30 do directly physically contact the first structural element hole sidewall 35 and the second structural element hole sidewall 37. In particular, in FIG. 1, the left-side of the fastener 30 as illustrated in FIG. 1, directly physically contacts the first structural element hole sidewall 35, and the right-side of the fastener 30 directly physically contacts the second structural element holes sidewall. Thus, this physical contact between the fastener 30 and the structural elements (first structural element 16 and second structural element 18) creates a current pathway for electric current between. An example electrical current pathway 70 is illustrated in FIG. 1 to show how electrical current may flow between the fastener 30 and the two example structural elements—the first structural element 16 and the second structural element 18. In particular, current may flow between the electrically conductive fibers in the structural elements (first structural element 16 and second structural element 18) and the fastener 30 via the CGF 24, in areas where the CGF 24 physically contacts the shank 40.

In some examples, the fastener 30 is sized to be smaller than both of the first structural element hole 48 and second structural element hole 50. However, in other examples, the fastener 30 is sized to be as large as, or larger than, one of the first structural element hole 48 and second structural element hole 50. In such examples, only one of the first gap 62 or second gap 64 exists. In still further examples, the shank 40 is sized to be just as large as (have the same diameter as), or larger than (have a larger diameter than), both of the first structural element hole 48 and second structural element hole 50, but to nonetheless fit into both of the holes at least in part because the electrically conductive coating 32 on the fastener and/or the CGF 24 of the first structural element sidewall 22 and second structural element sidewall 41 are soft enough to deform and permit entry of the oversized shank 40.

However, even in such examples where gaps 62 and/or 64 exist between the fastener 30 and the first structural element hole sidewall 35 and second structural element hole sidewall 37, respectively, the electrically conductive coating 32 and the CGF 24 work together to provide a more continuous electrical connection between the fastener 30 and the first structural element 16 and second structural element 18 in the regions where the fastener 30 and the first structural element hole sidewall 35 and second structural element hole sidewall 37 of the first structural element 16 and second structural element 18 do make contact. In particular, because of their higher electrical conductivity, and because they provide smoother, flatter surfaces that increase surface area contact between the fastener 30 and the first structural element hole sidewall 35 and second structural element hole sidewall 37 of the first structural element 16 and second structural element 18, the electrically conductive coating 32 and the CGF 24 increase electrical conductivity between the fastener 30 and the first structural element 16 and second structural element 18.

In this way, the electrically conductive coating 32 and the CGF 24 provide sufficient EME protection to enable the cheaper, more time efficient FSDA to be used without sacrificing safety. Further, the electrically conductive coating 32 prevents galling during insertion of the fastener 30. The electrically conductive coating 32 also aids lubricity by providing a lubricious surface to reduce the amount of force required to insert the fastener 30 into the first structural element hole 48 and the second structural element hole 50, thereby providing manufacturing efficiencies and reducing the chance of damaging the structural assembly 12 during insertion of the fastener 30 while at the same time not impeding or degrading EME performance.

In some examples, the end of the shank 40, which defines a first end 52 of the fastener 30, extends all of the way through the first structural element hole 48 and second structural element hole 50 and protrudes on the other side of the structural assembly 12 beyond the second structural element 18 (as shown in FIG. 1). In some such examples, the fastening system 10 includes a fastener mating element 46 on the opposite side of the structural assembly 12 from the fastener head 38 of the fastener 30. The fastener mating element 46 mates with the portion of the shank 40 that protrudes from the second structural element 18 and secures (i.e. compresses) the first structural element 16 and the second structural element 18.

The fastener 30 includes one or more of a bolt, pin, and rivet. Correspondingly, the fastener mating element 46 comprises one or more of internally threaded nuts or collars and swaged collars that mate with the particular type of fastener 30 being used. As one example, such as is shown in FIG. 1, the fastener 30 comprises a bolt, where at least a portion of the shank 40 includes a threaded mating portion 42 that extends from the first end 52 towards the fastener head 38 of the fastener 30. In some such examples, the fastener mating element 46 comprises a nut with internal threads (not shown), where the internal threads of the nut mate with threads 44 of the threaded mating portion 42 of the shank 40. Thus, the nut is threaded onto the end of the shank 40. In some further such examples, a washer 47 is additionally included between the fastener mating element 46 and the second structural element 18 to distribute the compressive force applied by the fastener mating element 46. However, in other examples, the fastener mating element 46 comprises a non-threaded collar that is swaged onto the mating portion 42 of the fastener 30.

In other examples, the fastener 30 comprises a blind or one-sided fastener, which does not require the fastener mating element 46. As their name suggests, one-sided fasteners are installed and secured from only one side of the structural assembly 12 and do not require any working on the other side of the structural assembly 12. As such, the fastening system 10 does not include the fastener mating element 46 in examples where the fastener 30 comprises a one-sided fastener. One-sided fasteners are particularly suitable for use in applications where access to one side of a structural assembly 12 is difficult or unavailable.

During installation, a manual rivet gun or automated system is used in some examples to hammer the fastener 30 into the first structural element hole 48 and second structural element hole 50. In other examples, the fastener 30 is installed using a robotic system to insert and hammer the fastener 30 into the first structural element hole 48 and second structural element hole 50, and another robot or a human affixes the fastener mating element 46 to the mating portion 42 from the other side of the structural assembly 12. When using a blind fastener, the blind fastener is installed into the first structural element hole 48 and second structural element hole 50 in the structural assembly 12 using methods known in the art.

Turning now to FIGS. 3A-6, illustrative non-exclusive examples of the fastener 30 and structural assembly 12 are illustrated. Where appropriate, the reference numerals from the schematic illustrations of FIGS. 1-2 are used to designate corresponding parts of the examples of FIGS. 3A-6; however, the examples of FIGS. 3A-6 are non-exclusive and do not limit the fastener 30 or structural assembly 12 to the illustrated embodiments of FIGS. 3A-6. That is, the fastener 30 and structural assembly 12 are not limited to the specific embodiments of FIGS. 3A-6, and the fastener 30 and structural assembly 12 may incorporate any number of the various aspects, configurations, characteristics, properties, etc. of fastener 30 and structural assembly 12 that are illustrated in and discussed with reference to the schematic representations of FIGS. 1-2 and/or the embodiments of FIGS. 3A-6, as well as variations thereof, without requiring the inclusion of all such aspects, configurations, characteristics, properties, etc. For the purpose of brevity, each previously discussed component, part, portion, aspect, region, etc. or variant thereof may not be discussed, illustrated, and/or labeled again with respect to the examples of FIGS. 3A-6; however, it is within the scope of the present disclosure that the previously discussed features, variants, etc. may be utilized with the examples of FIGS. 1-2.

Focusing on FIGS. 3A-3C, they show schematic top views of various examples of how at least a portion of the first structural element hole sidewall 35 and second structural element hole sidewall 37 of the first structural element hole 48 and second structural element hole 50 may not align when the first structural element 16 and second structural element 18 are assembled into the structural assembly 12. FIGS. 3A and 3B show misalignment conditions where example holes of the first structural element hole 48 and second structural element hole 50 are not aligned. In the example of FIG. 3A, which mirrors the schematic examples shown in FIGS. 1 and 2, first example first structural element hole 320 and first example second structural element hole 310 of first structural element hole 48 and second structural element hole 50 respectively, are the same size, but misaligned. In the example of FIG. 3B, second example first structural element hole 340 and second example second structural element hole 330 of first structural element hole 48 and second structural element hole 50 respectively, are of different size and are misaligned. In the example of FIG. 3C, third example first structural element hole 360 and third example second structural element hole 350 of first structural element hole 48 and second structural element hole 50 respectively, are aligned, but are of different size.

The more misaligned the holes are (the more offset the holes are from one another), the smaller the area of overlap between the holes. In some examples, the shank 40 of the fastener 30 is sized based on this amount of overlap. In particular, in such examples, the shank 40 of the fastener 30 is sized to be equal to, or slightly larger than, the minimum diameter of the area of overlap between the holes.

As in FIGS. 1 and 2, FIG. 3A shows example holes that are the same diameter, but misaligned. In particular, a first example first structural element hole 320 of the first structural element hole 48 is misaligned with a first example second structural element hole 310 of the second structural element hole 50. That is, a central axis 322 of the first example first structural element hole 320 is offset from a central axis 312 of the first example second structural element hole 310, such that the perimeters of the first example second structural element hole 310 and first example first structural element hole 320 are not aligned with one another. Thus, at least a portion of the first structural element hole sidewall 35 and second structural element hole sidewall 37 do not align. In one example, the shank 40 of the fastener 30 is sized to have a diameter equal to, or slightly larger than, the minimum diameter of the area of overlap between the holes as shown in FIG. 3A. In another example, the shank 40 of the fastener 30 is sized to have a diameter equal to, or slightly larger than, the diameter of the first example second structural element hole 310 and first example first structural element hole 320. The shank 40 may still fit in the undersized area of overlap because the electrically conductive coating 32 on the fastener and/or the CGF 24 on the first structural element hole sidewall 35 and second structural element hole sidewall 37 are soft enough to deform and allow the shank 40 to enter the smaller area of overlap.

FIG. 3B shows example holes that are misaligned and different sizes. In particular, a second example first structural element hole 340 of the first structural element hole 48 is misaligned with a second example second structural element hole 330 of the second structural element hole 50. That is, a central axis 342 of the second example first structural element hole 340 is offset from a central axis 332 of the second example second structural element hole 330, such that the perimeters of the second example second structural element hole 330 and second example first structural element hole 340 are not aligned with one another. However, unlike the example in FIG. 3A, in the example of FIG. 3B, the entire second example first structural element hole 340 overlaps with the second example second structural element hole 330 because the second example first structural element hole 340 is smaller in diameter than the second example second structural element hole 330. Thus, although a portion of the first structural element hole sidewall 35 and second structural element hole sidewall 37 do not align, at least a portion of the first structural element hole sidewall 35 and second structural element hole sidewall 37 do align. In one example, the shank 40 of the fastener 30 is sized to have a diameter equal to, or slightly larger than, the smaller of the two holes, which in the example of FIG. 3B, is second example first structural element hole 340. However, in another example, the shank 40 of the fastener 30 is sized to have a diameter approximately equal to, or slightly larger than, the larger of the two holes, which in the example of FIG. 3B, is second example second structural element hole 330. The shank 40 may still fit into the smaller hole (second example first structural element hole 340 in the example of FIG. 3B) because the electrically conductive coating 32 on the fastener and/or the CGF 24 on the first structural element hole sidewall 35 and second structural element hole sidewall 37 are soft enough to deform and allow the shank 40 to enter the smaller of the two holes.

FIG. 3C shows example holes that are different sizes, but are aligned. In particular, a third example first structural element hole 360 of the first structural element hole 48 and a third example second structural element hole 350 of the second structural element hole 50 are aligned with one another along a common central axis 355. However, in the example of FIG. 3C, the third example first structural element hole 360 is larger in diameter than the third example second structural element hole 350 such that the perimeters of the third example second structural element hole 350 and third example first structural element hole 360 are not aligned with one another. Thus, at least a portion of the first structural element hole sidewall 35 and second structural element hole sidewall 37 do not align. In such an example, the shank 40 of the fastener 30 is sized to have a diameter equal to, or slightly larger than, the smaller of the two holes, which in the example of FIG. 3C, is second example first structural element hole 340. In one example, the shank 40 of the fastener 30 is sized to have a diameter equal to, or slightly larger than, the smaller of the two holes, which in the example of FIG. 3C, is third example second structural element hole 350. In such an example, the fastener 30 may contact the first structural element 16 with the fastener head 38. However, in another example, the shank 40 of the fastener 30 is sized to have a diameter approximately equal to, or slightly larger than, the larger of the two holes, which in the example of FIG. 3C, is third example first structural element hole 360. The shank 40 may still fit into the smaller hole (third example second structural element hole 350 in the example of FIG. 3C) because the electrically conductive coating 32 on the fastener and/or the CGF 24 on the first structural element hole sidewall 35 and second structural element hole sidewall 37 are soft enough to deform and allow the shank 40 to enter the smaller of the two holes.

Figure 4:
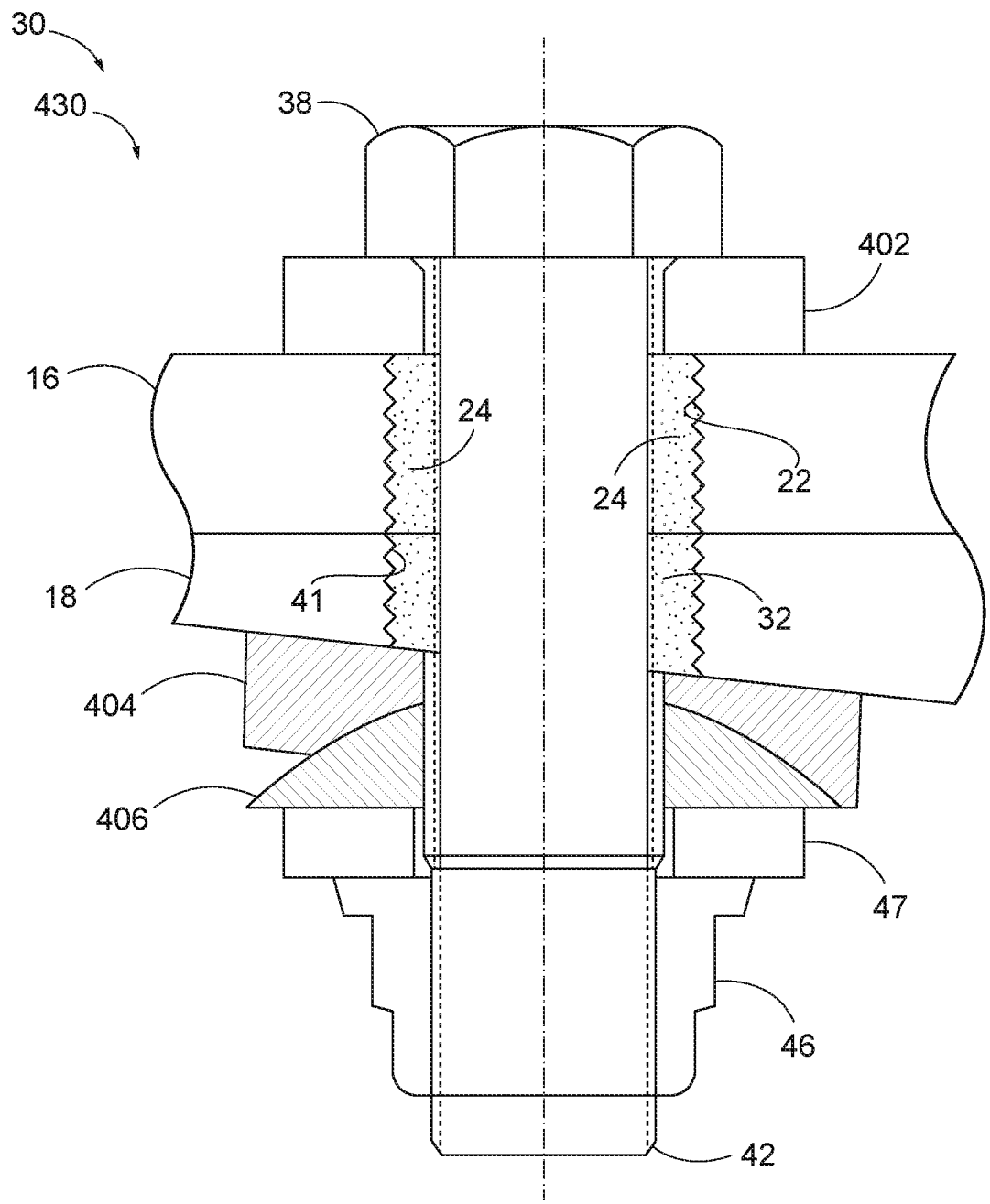
FIG. 4 is a cross-sectional view of a first example fastener of the fastening system of FIG. 1.
Figure 5:
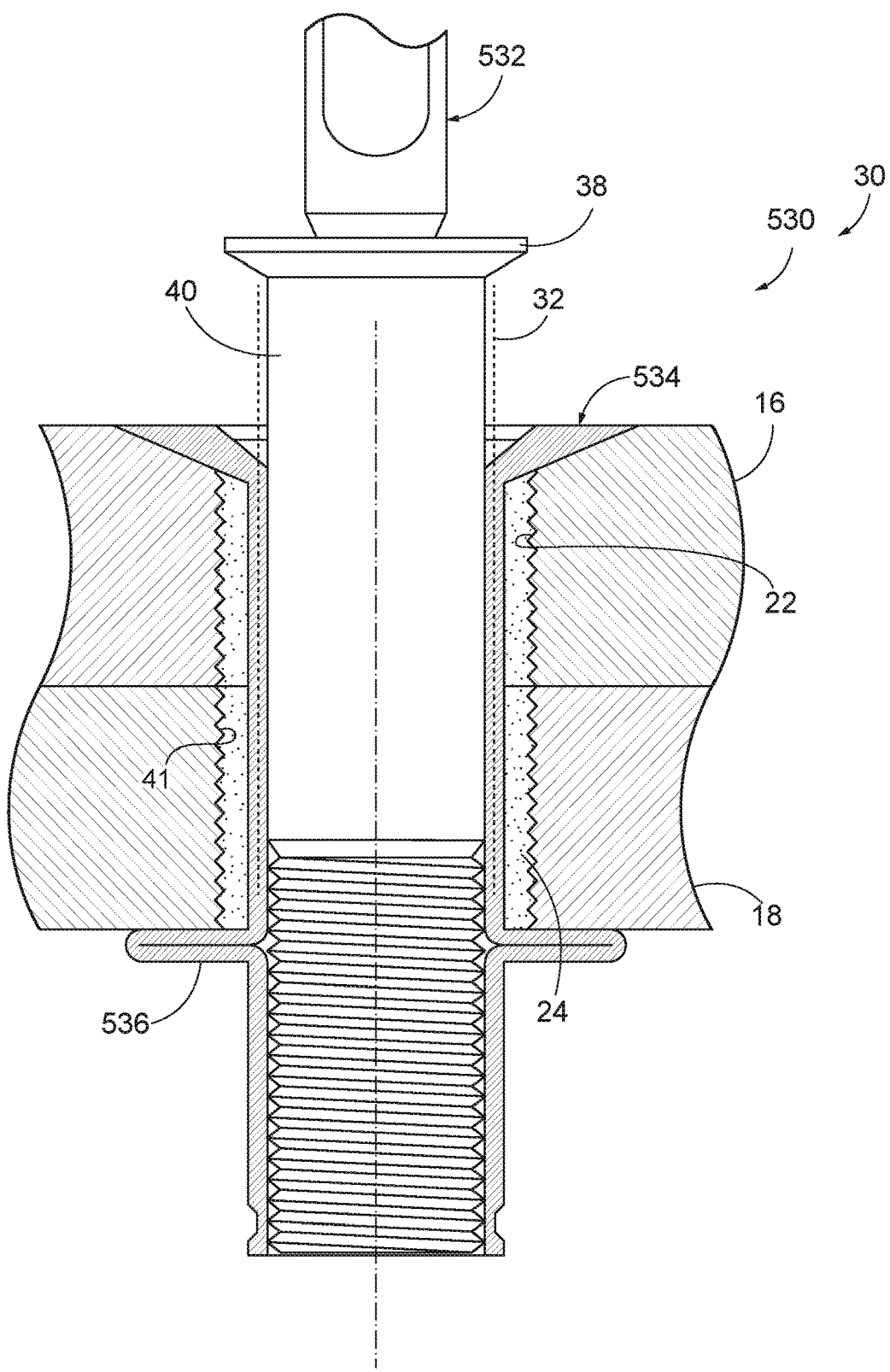
FIG. 5 is a cross-sectional view of a second example fastener of the fastening system of FIG. 1.
Figure 6:
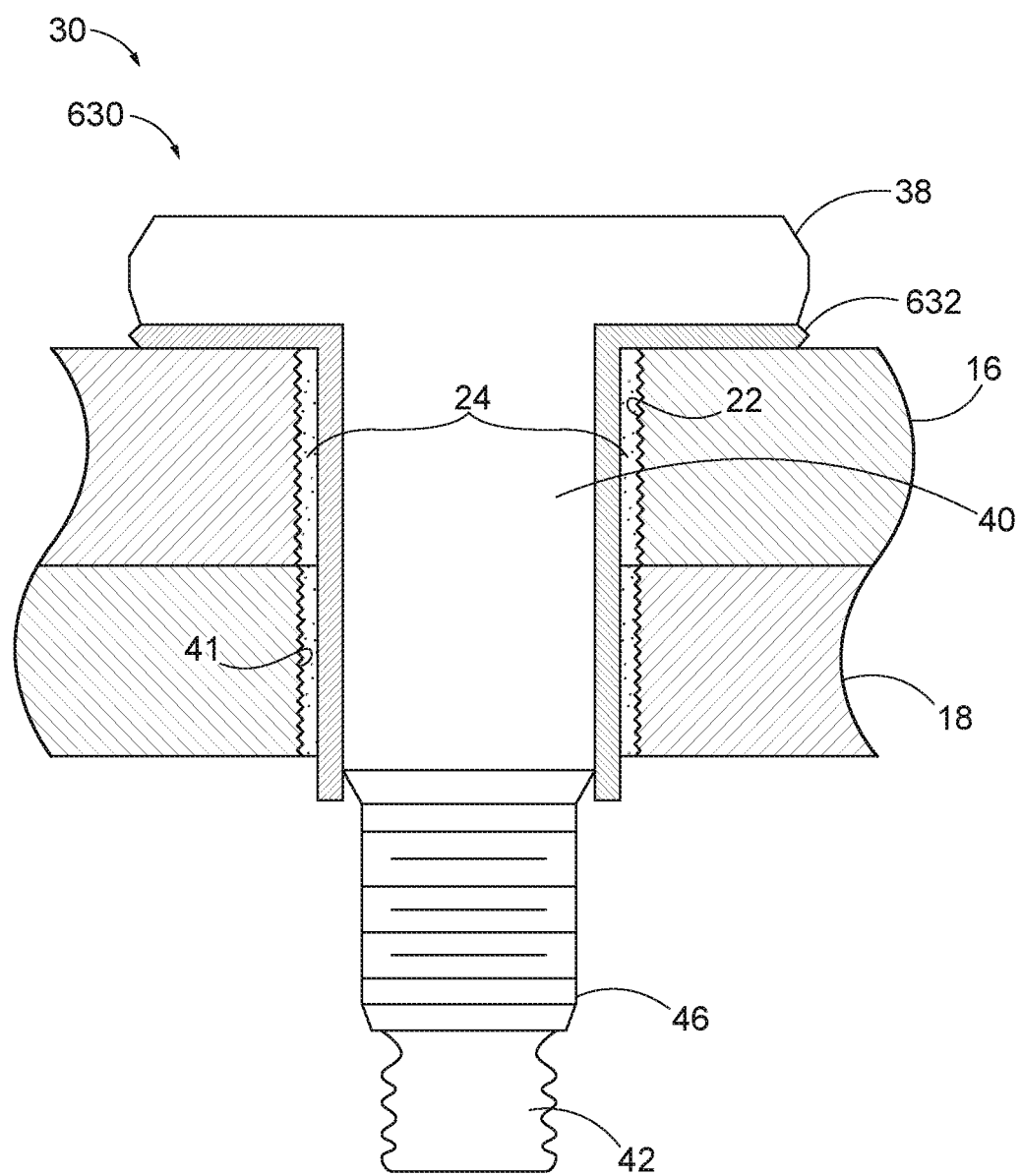
FIG. 6 is a cross-sectional view of a third example fastener of the fastening system of FIG. 1.

Turning now to FIGS. 4-6, they show various embodiments of the fastener 30. FIG. 4 shows an example of a sleeveless fastener, FIG. 5 shows an example of a one-sided fastener, and FIG. 6 shows an example of a sleeved fastener. In the example of FIG. 4, the sleeveless solid shank fastener may form a clearance fit with one or more of the first structural element hole 48 and second structural element hole 50 of the first structural element 16 and second structural element 18, respectively, as in the example of FIG. 1. However, in the examples of FIGS. 5 and 6, the fasteners comprise sleeves that may expand within the first structural element hole 48 and second structural element hole 50 to form interference fits with the first structural element hole 48 and second structural element hole 50 of the first structural element 16 and second structural element 18, respectively. Thus, the sleeved fasteners may not need the electrically conductive coating 32 to meet EME requirements, and thus in some examples, do not include the electrically conductive coating 32. However, the sleeveless fastener shown in FIG. 4 includes the electrically conductive coating 32.

It is important to note that although the first gap 62 and second gap 64 are not illustrated in FIGS. 4-6, the first gap 62 and the second gap 64 may nonetheless exist; they may just be too small to be clearly visible. Thus, the first structural element hole 48 and the second structural element hole 50 may still be misaligned even though they may appear to be aligned in FIGS. 4-6.

As seen in FIG. 4, fastener 430 is an example of fastener 30 that is a sleeveless solid shank fastener. Thus, as shown in FIG. 4, the fastener 30 does not include a sleeve like the example fastener shown in FIG. 6. The fastener 30 includes electrically conductive coating 32 which is in direct physical contact with the CGF 24 that coats the sidewalls of at least one of the first structural element 16 and second structural element 18. In the example of FIG. 4, both the first structural element 16 and second structural element 18 comprise an electrically conductive fiber reinforced plastic, and thus the CGF 24 is coated on the first structural element sidewall 22 and the second structural element sidewall 41 of both of the first structural element 16 and second structural element 18, respectively. However, in other examples, one of the first structural element 16 or second structural element 18 comprises a metal or metal alloy and does not include the CGF 24.

In the example of FIG. 4, the fastener 430 is not a one-sided fastener. Thus, the fastener 430 secures and compresses the first structural element 16 and second structural element 18 via fastener mating element 46. In the example of FIG. 4, fastener mating element 46 is a nut which is either threaded or swaged onto the mating portion 42 of the fastener 430. Further, in the example of FIG. 4, the fastening system 10 additionally includes a countersunk washer 402 between the fastener head 38 of the fastener 30 and the first structural element 16, and a pair of levelling washers 404 and 406 between the washer 47 and the second structural element 18. The pair of levelling washers 404 and 406 comprises concave levelling washer 404 and convex levelling washer 406. In the example of FIG. 4, the second structural element 18 is angled, and the levelling washers 404 and 406 are included to square off assembly 12.

As seen in FIG. 5, fastener 530 is an example of fastener 30 that comprises a one-sided fastener. The one-sided fastener 530 comprises a sleeve 534 and a frangible driving element 532 in addition to the shank 40 and fastener head 38. An example of one-sided fastener 530 is described in U.S. Pat. No. 10,294,976 entitled "METHOD OF INSTALLING A STRUCTURAL BLIND FASTENER," the entire contents of which are hereby incorporated by reference. As described in the '976 patent, frangible driving element 532 drives the shank 40 into the sleeve 534 and the first structural element 16 and second structural element 18. As the shank 40 is driven further into the sleeve 534, a self-locking mechanism 536 of the sleeve 534 buckles back against the second structural element 18 and compresses the first structural element 16 and second structural element 18 together. In some examples, the self-locking mechanism 536 comprises a softened portion of the sleeve 534 that is softened through a thermal treatment. In other examples, the self-locking mechanism 536 comprises a spring-actuated mechanism that expands radially outwards once it clears the second structural element 18.

In the example of FIG. 5, the first structural element 16 forms a portion of the skin of the aircraft, and thus, the fastener head 38 comprises a countersunk fastener head that extends all of the way into the first structural element 16 and does not protrude from the surface of the first structural element 16 when fully installed. FIG. 5 shows the fastener 530 only partially installed (mid-way through installation). When fully installed (e.g., when the shank 40 and fastener head 38 are fully inserted into the sleeve 534), the fastener head 38 does not protrude from the first structural element 16, and the frangible driving element 532 breaks off from the fastener head 38.

In some examples, the sleeve 534 and the shank 40 include the electrically conductive coating 32. However, in other examples, only the shank 40 includes the electrically conductive coating 32. In yet further examples, only the sleeve 534 includes the electrically conductive coating 32. In still further examples, neither the sleeve 534 nor the shank 40 include the electrically conductive coating 32.

As seen in FIG. 6, fastener 630 is an example of fastener 30 that comprises a sleeved fastener and includes a sleeve 632. The sleeve 632 expands as the shank 40 is driven further into the sleeve 632 and the first structural element 16 and second structural element 18 to form an interference fit with the first structural element hole 48 and second structural element hole 50 of the first structural element 16 and second structural element 18, respectively. Because the sleeve 632 forms an interference fit with the first structural element 16 and second structural element 18, the fastener 30 may not need electrically conductive coating 32 to meet EME requirements. Thus, in the example of FIG. 6, the fastener 630 does not include electrically conductive coating 32. However, in other examples, the fastener 630 does include electrically conductive coating 32. In particular, the sleeve 632 and/or shank 40 may include the electrically conductive coating 32 in such examples.

In the example of FIG. 6, the fastener 630 is not a one-sided fastener. Thus, the fastener 630 secures and compresses the first structural element 16 and second structural element 18 via fastener mating element 46. In the example of FIG. 4, fastener mating element 46 is a nut and/or collar which is either threaded or swaged onto the mating portion 42 of the fastener 630.

Figure 7:
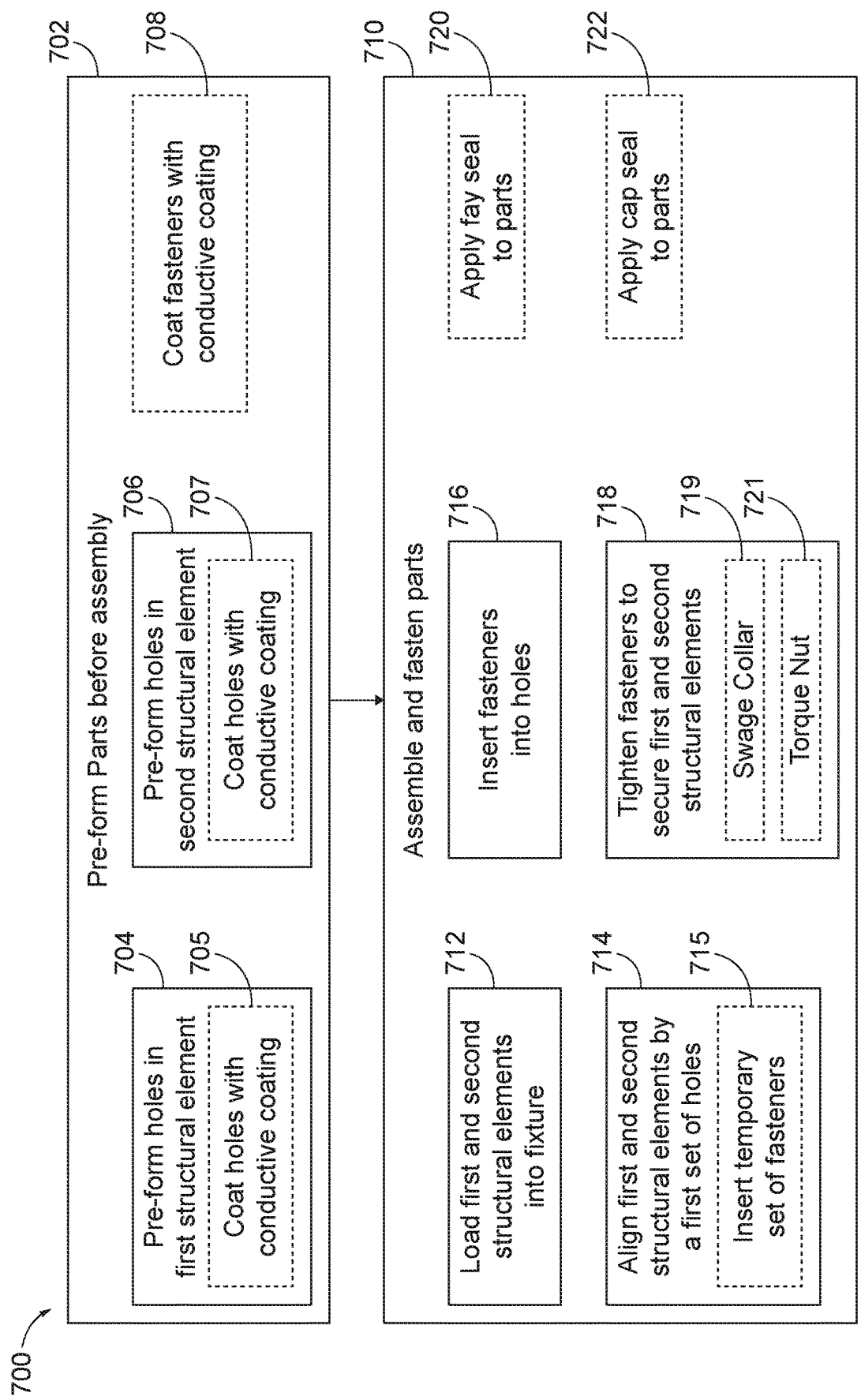
FIG. 7 is a flowchart schematically representing methods for assembling at least two aircraft structural components using FSDA, and fastening the assembled structural assembly with a fastening system.

FIG. 7 schematically provides a flowchart that represents illustrative, non-exclusive examples of methods according to the present disclosure. In FIG. 7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein.

As seen in FIG. 7, a method 700 for assembling and fastening aircraft structural elements using FSDA and conductively coated fasteners and/or holes is shown. In accordance with FSDA procedure, method 700 includes at least the steps of pre-forming parts before assembly at 702 and then assembling and fastening the parts at 710. In particular, the parts are pre-formed separately (e.g., at different times and/or different locations) in accordance with FSDA procedure at 702. The parts are then brought together and fastened using the fastening system (e.g., fastening system 10) at 710. The parts include structural elements (e.g., first structural element 16 and second structural element 18).

The pre-forming the parts at 702 comprises pre-forming holes (e.g., first structural element hole 48) in a first structural element (e.g., first structural element 16) at 704 and separately pre-forming holes (e.g., second structural element hole 50) in a second structural element (e.g., second structural element 18) at 706. As noted above, the holes are pre-formed separately. In particular, the holes may be pre-formed at different times and/or different locations. Thus, the structural elements are not stacked or otherwise assembled together when the holes are formed. Said another way, the holes are not formed when the structural elements stacked on top of one another.

The holes are formed by one or more of drilling, reaming, or molding. In some examples, the pre-forming the holes at 704 and 706 additionally comprises coating the holes with a conductive coating. In particular, the holes of a structural element are coated with the conductive coating if the structural element comprises an electrically conductive fiber reinforced plastic (e.g., CFRP). If the structural element comprises a metal or metal alloy and not an electrically conductive fiber reinforced plastic, the method 700 does not include coating the structural element with the conductive coating.

Thus, in examples where the first structural element comprises an electrically conductive fiber reinforced plastic (e.g., CFRP), the pre-forming the holes in the first structural element at 704 additionally comprises coating the holes with a conductive coating (e.g., CGF 24) at 705. Similarly, in examples where the second structural element comprises an electrically conductive fiber reinforced plastic, the pre-forming the holes in the second structural element at 706 additionally comprises coating the holes with the conductive coating at 707. As explained above, at least one of the two structural elements comprises an electrically conductive fiber reinforced plastic. Thus, the holes of at least one of the structural elements is coated with the conductive coating at 702. In examples where both of the structural elements comprise electrically conductive fiber reinforced plastic, the holes of both of the structural elements are coated with the conductive coating. In particular, the coating is applied to the sidewalls (e.g., first structural element sidewall 22 and second structural element sidewall 41) of the holes of the structural elements (e.g., first structural element hole 48 and second structural element hole 50) with the electrically conductive coating.

Coating techniques have already been described above, but may include use of a split mandrel tool cast with a low melting alloy (LMA) as described in commonly-owned U.S. patent application Ser. No. 15/923,630 entitled "METHOD, APPARATUS AND APPLICATOR FOR APPLYING A COATING ON A SURFACE OF A LAMINATION," the disclosure of which is incorporated by reference herein in its entirety.

In some examples, the pre-forming the parts at 702 additionally comprises coating fasteners (e.g., fastener 30) with a conductive coating (e.g., electrically conductive coating 32) at 708. In particular, the conductive coating is applied in examples where the fasteners comprise a sleeveless and/or one-sided fastener. As described above, methods for coating the fastener with the conductive coating are described in commonly-owned U.S. patent application Ser. No. 16/693,613, entitled "METHOD FOR PLATING A METALLIC MATERIAL ONTO A TITANIUM SUBSTRATE," and U.S. patent application Ser. No. 16/242,115, entitled "CONDUCTIVE FASTENING SYSTEM AND METHOD FOR IMPROVED EME PERFORMANCE," the disclosures of which are incorporated by reference herein in their entireties.

The assembling and fastening at 710 comprises assembling the first structural element and second structural element having the pre-formed holes and fastening the assembly with a fastening system (e.g., fastening system 10) comprising one or more fasteners (e.g., fastener 30). In some examples, the method 700 additionally comprises applying fay seal to the parts (structural elements) at 720.

In particular, the assembling comprises bringing all detail parts (e.g., first structural element 16 and second structural element 18) together, stacking the parts, and aligning the parts to form a structural assembly (e.g., structural assembly 12). In particular, the assembling may comprise loading the first structural element and second structural element into a fixture at 712 and aligning the first structural element and second structural element by a first set of holes at 714. As noted at 715, the aligning may comprise inserting a temporary set of fasteners (e.g., tack fasteners) into the first set of holes. In some examples, the first set of holes only comprises a subset of the holes formed at 702. Thus, in some examples, the aligning at 714 comprises inserting temporary fasteners in only some of the holes formed at 702 to align the first structural element and second structural element.

The fastening comprises inserting the fasteners (e.g., fastener 30) into the holes (e.g., first structural element hole 48 and second structural element hole 50) at 716. In some examples, where temporary fasteners (tack fasteners) were initially inserted to align the structural elements, the method 700 at 716 comprises inserting a first set of fasteners into the open holes that do not have temporary fasteners in them, removing the temporary fasteners after inserting the first set of fasteners, and then inserting a second set of the fasteners into the remaining holes that previously held the temporary fasteners.

The fastening further comprises tightening the fasteners to secure the first structural element and second structural element at 718. When the fastener comprises a one-sided fastener, the tightening may comprise rotating the fastener past the point at which its self-locking mechanism engages the structural assembly. When the fastener does not comprise fastener head 38a one-sided fastener, the tightening at 718 may comprise threading a threaded nut onto the mating portion (e.g., mating portion 42) of the fastener that protrudes from the opposite end of the structural assembly as the head of the fastener, and torqueing the nut at 721. In other examples where the fastener does not comprise a one-sided fastener, the tightening at 718 may comprise sliding a collar onto the mating portion of the fastener and swaging the collar at 719.

In some examples, the method 700 additionally includes applying cap seal to the parts at 722. However, in other examples, the method 700 does not include applying cap seal to the parts at 722.

By coating the first structural element sidewall 22 and second structural element sidewall 41 of the first structural element hole 48 and second structural element hole 50 with CGF 24 and/or by coating the fastener 30 with the electrically conductive coating 32, a much greater current pathway (i.e. larger cross-sectional area) is provided for electric current from lightning strikes to flow through the fastener 30 to the surrounding first structural element 16 and second structural element 18. In particular, the CGF 24 and electrically conductive coating 32 provide more surface area contact between the fastener 30 and the first structural element 16 and second structural element 18, thereby increasing the number of electrically conductive fibers that make contact with the fastener 30, and thus increasing the current pathway between the fastener 30 and the first structural element 16 and second structural element 18, and decreasing current density. The CGF 24 and electrically conductive coating 32 reduce current density to such a degree that the cheaper, and more time efficient, FSDA can be utilized with cheaper sleeveless bolts without sacrificing safety. In particular, the CGF 24 and electrically conductive coating 32 provide enough surface area contact between sleeveless fasteners and the first structural element 16 and second structural element 18 that lightning protection is ensured even when the first structural element hole 48 and second structural element hole 50 are misaligned (as may be the case when using FSDA). FSDA allows for a cheaper and more time efficient assembly, production, and manufacture of the aircraft component. Further, the above features may eliminate the need for cap and/or fay seal, thereby further reducing production costs.

Figure 8:
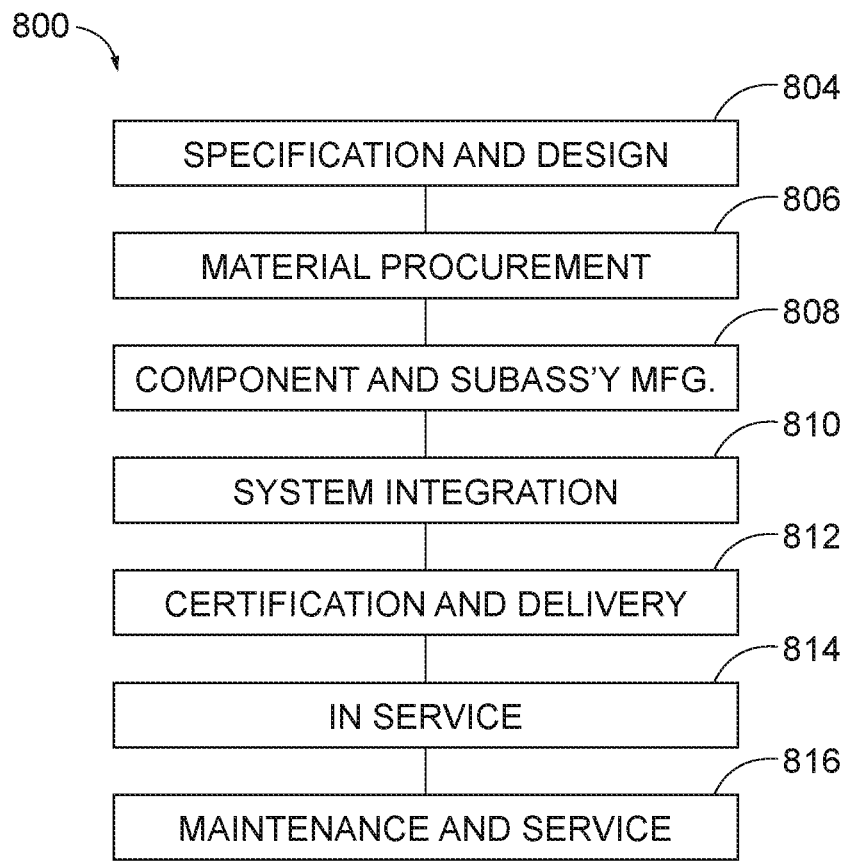
FIG. 8 is a flow diagram of aircraft production and service methodology.
Figure 9:
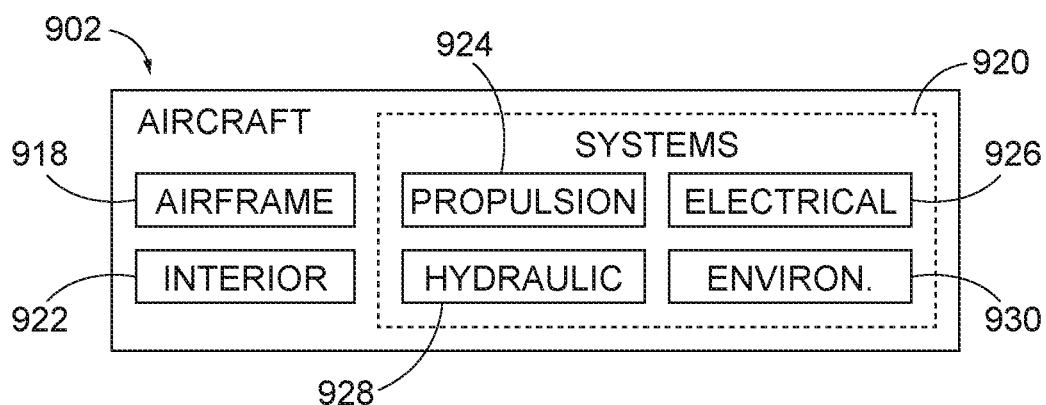
FIG. 9 is a block diagram of an aircraft.

Referring to FIGS. 8 and 9, a service method 800 is shown in FIG. 8 and an aircraft 902 is shown in FIG. 9. During pre-production, exemplary method 800 may include specification and design 804 of the aircraft 902 and material procurement 806 which may include procurement of first structural element 16 and second structural element 18. During production, component and subassembly manufacturing 808 and system integration 810 of the aircraft 902 takes place. Production may include assembly and fastening of the first structural element 16 and second structural element 18 via the fastening system 10 to form the structural assembly 12. Thereafter, the aircraft 902 may go through certification and delivery 812 in order to be placed in service 814. While in service by a customer, the aircraft 902 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 902 produced by exemplary method 800 may include an airframe 918 with a plurality of systems 920 and an interior 922. As described above, the structural assembly 12 (including first structural element 16 and second structural element 18) and fastening system 10 may comprise a portion of the airframe 918. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the aircraft 902 is in service. Also, one or more apparatus embodiments, method embodiments, or a combination thereof may be utilized during the production stages 808 and 810, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 816.

Illustrative, non-exclusive examples of inventive subject matter according to the present disclosure are described in the following enumerated paragraphs:

A. An apparatus comprising a fastening system and a structural assembly, wherein: the structural assembly comprises: a first structural element made of an electrically conductive fiber reinforced plastic, the first structural element comprising a first hole having a first structural element sidewall; a second structural element, the second structural element comprising a second hole having a second structural element sidewall; and an electrically conductive gap filler applied to the first structural element sidewall of the first hole of the first structural element, wherein the electrically conductive gap filler defines a first hole sidewall of the first hole; wherein at least a portion of the first structural element sidewall and the second structural element sidewall do not align; and wherein the fastening system comprises: a fastener comprising a head and a shank extending from the head into the first hole and the second hole.

A1. The apparatus of paragraph A1, wherein the first structural element is made of a carbon fiber reinforced plastic (CFRP).

A2. The apparatus of any of paragraphs A and A1, wherein the fastening system further comprises an electrically conductive coating formed on the shank of the fastener.

A3. The apparatus of any of paragraphs A-A2, wherein the first hole comprises a pre-formed hole that is formed before assembly of the first structural element and the second structural element.

A4. The apparatus of paragraph A3, wherein the electrically conductive gap filler is abraded onto the first hole sidewall before assembly of the first structural element and the second structural element.

A5. The apparatus of any of paragraphs A-A4, wherein the first structural element sidewall comprises irregular surfaces, and wherein the first hole sidewall defined by the electrically conductive gap filler comprises flat surfaces.

A6. The apparatus of any of paragraphs A-A5, wherein the second hole comprises a pre-formed hole that is formed before assembly of the first structural element and the second structural element.

A7. The apparatus of any of paragraphs A-A6, wherein the structural assembly is assembled using full size determinant assembly (FSDA).

A8. The apparatus of any of paragraphs A-A7, wherein the electrically conductive gap filler is applied to the second structural element sidewall of the second hole and defines a second hole sidewall of the second hole, and wherein the fastener physically contacts at least a portion of the first hole sidewall and at least a portion of the second hole sidewall, but wherein the fastener is in a clearance fit with at least one of the first hole and the second hole.

A9. The apparatus of paragraph A8 further comprising a first gap between the fastener and the first hole sidewall of the first hole.

A10. The apparatus of claim 9, further comprising a second gap between the fastener and the second hole sidewall of the second hole.

A11. The apparatus of any of paragraph A-A10, wherein the fastener comprises a sleeveless fastener.

A12. The apparatus of any of paragraphs A-A11, wherein the fastener comprises a one-sided fastener.

A13. The apparatus of any of paragraphs A-A12, wherein the fastener comprises a sleeved fastener.

B. A method for assembling and fastening a first structural element comprising an electrically conductive fiber reinforced plastic and a second structural element, the method comprising:

assembling the first structural element and second structural element using full size determinant assembly (FSDA); and fastening the first structural element and second structural element by inserting a fastener into overlapping holes of the first structural element and second structural element, wherein at least one of the overlapping holes is pre-formed and pre-coated with an electrically conductive gap filler prior to assembling the first structural element and second structural element.

B1. The method of paragraph B, wherein the overlapping holes are misaligned.

B2. The method of claim 15, further comprising separately pre-forming first structural element holes of the overlapping holes in the first structural element and second structural element holes of the overlapping holes in the second structural element before assembling the first structural element and the second structural element.

B2.1 The method of paragraph B2, wherein the pre-forming the first structural element holes and the second structural element holes comprises drilling the holes.

B2.2. The method of any of paragraphs B2-B2.1, wherein the separately pre-forming the first structural element holes and the second structural element holes comprises pre-forming the first structural element holes in the first structural element at a different time and/or a different location than the second structural element holes in the second structural element.

B3. The method of any of paragraphs B2-B2.2, further comprising coating the first structural element holes with the electrically conductive gap filler.

B4. The method of any of paragraphs B-B3, further comprising coating the fastener with the electrically conductive coating.

B4.1. The method of paragraph B4, wherein the electrically conductive coating comprises indium, and wherein the fastener comprises titanium.

B4.2. The method of paragraph B4.1, wherein the coating the fastener with the electrically conductive coating comprises activating the fastener and electroplating the fastener with the electrically conductive coating.

B5. The method of any of paragraphs B-B4.2, wherein the fastening comprises forming a clearance fit with the at least two structural elements by physically contacting only a portion of one or more sidewalls of the misaligned holes.

B6. The method of any of paragraphs B-B4.2, wherein the fastening comprises forming an interference fit with at least one of the structural elements.

B7. The method of any of paragraphs B-B6, wherein the fastening comprises inserting a plurality of fasteners into a plurality of holes of the first structural element and second structural element, and wherein the assembling comprises inserting a set of temporary fasteners into a first hole subset of the plurality of holes, and wherein the fastening further comprises inserting a first fastener subset of the plurality of fasteners into a second hole subset of the plurality of holes that do not contain the temporary fasteners, then removing the temporary fasteners and inserting a second fastener subset of the plurality of fasteners into the first hole subset of the plurality of holes.

C. A method for assembling and fastening at least two structural elements, the method comprising: assembling the at least two structural elements using full size determinant assembly (FSDA); and fastening the at least two structural elements by inserting a conductively coated fastener into misaligned holes of the at least two structural elements.

C1. The method of paragraph C, wherein the assembling further comprises pre-forming the misaligned holes and pre-coating the misaligned holes with an electrically conductive gap filler before bringing the at least two structural elements together.

C1.1 The method of paragraph C1, wherein the pre-forming comprises pre-drilling the misaligned holes.

C2. The method of any of paragraphs C1-C1.1, further comprising coating the conductively coated fastener with an electrically conductive coating comprising indium, wherein the coating comprises activating the fastener and electroplating the fastener with the electrically conductive coating, wherein the conductively coated fastener comprises titanium.

C3. The method of any of paragraphs C1-C2, wherein the fastening comprises forming a clearance fit with the at least two structural elements by physically contacting only a portion of one or more sidewalls of the misaligned holes.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An apparatus comprising a fastening system and a structural assembly, wherein:
    the structural assembly comprises:
        a first structural element made of an electrically conductive fiber reinforced plastic, the first structural element comprising a first hole having a first structural element sidewall;
        a second structural element, the second structural element comprising a second hole having a second structural element sidewall; and
        an electrically conductive gap filler applied to the first structural element sidewall of the first hole of the first structural element, wherein the electrically conductive gap filler defines a first hole sidewall of the first hole;
        wherein at least a portion of the first structural element sidewall and the second structural element sidewall do not align; and wherein
    the fastening system comprises:
        a fastener comprising a head and a shank extending from the head into the first hole and the second hole.

2. The apparatus of claim 1, wherein the first structural element is made of a carbon fiber reinforced plastic (CFRP).

3. The apparatus of claim 1, wherein the fastening system further comprises an electrically conductive coating formed on the shank of the fastener.

4. The apparatus of claim 1, wherein the first hole comprises a pre-formed hole that is formed before assembly of the first structural element and the second structural element.

5. The apparatus of claim 4, wherein the electrically conductive gap filler is abraded onto the first hole sidewall before assembly of the first structural element and the second structural element.

6. The apparatus of claim 1, wherein the first structural element sidewall comprises irregular surfaces, and wherein the first hole sidewall defined by the electrically conductive gap filler comprises flat surfaces.

7. The apparatus of claim 1, wherein the second hole comprises a pre-formed hole that is formed before assembly of the first structural element and the second structural element.

8. The apparatus of claim 1, wherein the structural assembly is assembled using full size determinant assembly (FSDA).

9. The apparatus of claim 1, wherein the electrically conductive gap filler is applied to the second structural element sidewall of the second hole and defines a second hole sidewall of the second hole, and wherein the fastener physically contacts at least a portion of the first hole sidewall and at least a portion of the second hole sidewall, but wherein the fastener is in a clearance fit with at least one of the first hole and the second hole.

10. The apparatus of claim 9, further comprising a first gap between the fastener and the first hole sidewall of the first hole.

11. The apparatus of claim 9, further comprising a second gap between the fastener and the second hole sidewall of the second hole.

12. The apparatus of claim 1, wherein the fastener comprises a sleeveless fastener.

13. The apparatus of claim 1, wherein the fastener comprises a one-sided fastener.

14. The apparatus of claim 1, wherein the fastener comprises a sleeved fastener.

15. A method for assembling the apparatus of claim 1, the method comprising:
- assembling the first structural element and the second structural element using full size determinant assembly (FSDA); and
- fastening the first structural element and the second structural element by inserting the fastener into the first hole and the second hole, wherein at least one of the first hole and the second hole is pre-formed and pre-coated with the electrically conductive gap filler prior to assembling the first structural element and the second structural element.

16. The method of claim 15, wherein the first hole and the second hole are misaligned.

17. The method of claim 15, further comprising separately pre-forming the first hole and the second hole before assembling the first structural element and the second structural element.

18. The method of claim 17, wherein the separately pre-forming the first hole and the second hole comprises pre-forming the first hole at a different time and/or a different location than the second hole.

19. The method of claim 17, further comprising coating the first hole with the electrically conductive gap filler.

20. The method of claim 15, wherein the fastening comprises inserting a plurality of fasteners into a plurality of holes of the first structural element and the second structural element, and wherein the assembling comprises inserting a set of temporary fasteners into a first hole subset of the plurality of holes, and wherein the fastening further comprises inserting a first fastener subset of the plurality of fasteners into a second hole subset of the plurality of holes that do not contain the temporary fasteners, then removing the temporary fasteners and inserting a second fastener subset of the plurality of fasteners into the first hole subset of the plurality of holes.

* * * * *